US011525380B2

(12) United States Patent
Su et al.

(10) Patent No.: US 11,525,380 B2
(45) Date of Patent: Dec. 13, 2022

(54) AFTERTREATMENT SYSTEM WITH MULTIPLE DOSING MODULES

(71) Applicant: Cummins Emission Solution Inc., Columbus, IN (US)

(72) Inventors: Changsheng C. Su, Columbus, IN (US); Liqiang Bian, Beijing (CN); Lei Jiang, Beijing (CN); Yi Xie, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/421,943

(22) PCT Filed: Jan. 11, 2019

(86) PCT No.: PCT/CN2019/071269
§ 371 (c)(1),
(2) Date: Jul. 9, 2021

(87) PCT Pub. No.: WO2020/143012
PCT Pub. Date: Jan. 6, 2020

(65) Prior Publication Data
US 2022/0025804 A1 Jan. 27, 2022

(51) Int. Cl.
*F01N 3/20* (2006.01)
(52) U.S. Cl.
CPC .......... *F01N 3/208* (2013.01); *F01N 2570/14* (2013.01); *F01N 2610/02* (2013.01);
(Continued)

(58) Field of Classification Search
CPC combination set(s) only.
See application file for complete search history.

(56) References Cited

U.S. PATENT DOCUMENTS

| 5,809,775 A | 9/1998 | Tarabulski et al. |
| 10,544,721 B2 * | 1/2020 | DeHart .................. F01N 3/208 |

(Continued)

FOREIGN PATENT DOCUMENTS

| CN | 101845978 A | 9/2010 |
| CN | 101879401 A | 11/2010 |

(Continued)

OTHER PUBLICATIONS

International Search Report & Written Opinion for PCT/CN2019/071269 dated Oct. 10, 2019, 11 pages.

*Primary Examiner* — Binh Q Tran
(74) *Attorney, Agent, or Firm* — Foley & Lardner LLP

(57) ABSTRACT

An aftertreatment system (100) includes a decomposition chamber (108), a reductant pump (120), a first dosing module (110), a second dosing module (112), and a controller (133). The first dosing module (110) is coupled to the decomposition chamber (108) and configured to receive reductant from the reductant pump (120). The second dosing module (112) is coupled to the decomposition chamber (108) and configured to receive reductant from the reductant pump (120) independent of the first dosing module (110). The controller (133) is communicatively coupled to the first dosing module (110) and the second dosing module (112). The controller (133) is configured to independently control a first volumetric flow rate of reductant provided from the first dosing module (110) into the decomposition chamber (108) and a second volumetric flow rate of reductant provided from the second dosing module (112) into the decomposition chamber (108).

36 Claims, 9 Drawing Sheets

(52) U.S. Cl.
CPC ...... *F01N 2610/146* (2013.01); *F01N 2610/1433* (2013.01); *F01N 2900/1812* (2013.01)

(56) References Cited

U.S. PATENT DOCUMENTS

| | | | |
|---|---|---|---|
| 10,787,945 B2* | 9/2020 | Landwehr | B01D 53/9431 |
| 11,098,625 B2* | 8/2021 | El-Gammal | B01F 25/10 |
| 11,215,100 B2* | 1/2022 | Lorenz | F01N 3/208 |
| 2014/0360168 A1* | 12/2014 | Broderick | F01N 3/208 60/274 |
| 2015/0196878 A1* | 7/2015 | Nunez | B01D 53/9418 422/111 |
| 2016/0061079 A1* | 3/2016 | Wentzel | F01N 3/208 60/287 |
| 2017/0241319 A1 | 8/2017 | Cornaglia | |

FOREIGN PATENT DOCUMENTS

| | | |
|---|---|---|
| CN | 101988412 A | 3/2011 |
| CN | 102022165 | 4/2011 |
| CN | 102269031 A | 12/2011 |
| CN | 102725051 A | 10/2012 |
| CN | 102748481 A | 10/2012 |
| CN | 102840014 A | 12/2012 |
| CN | 103157375 A | 6/2013 |
| CN | 103256102 A | 8/2013 |
| CN | 103282615 A | 9/2013 |
| CN | 103962023 A | 8/2014 |
| CN | 104110293 A | 10/2014 |
| CN | 104258730 A | 1/2015 |
| CN | 104454093 A | 3/2015 |
| CN | 104557617 A | 4/2015 |
| CN | 104612791 A | 5/2015 |
| CN | 106555643 A | 4/2017 |
| CN | 107149875 A | 9/2017 |
| CN | 107398176 A | 11/2017 |
| CN | 108474282 A | 8/2018 |
| WO | WO-2018/075061 A1 | 4/2018 |

* cited by examiner

AFTERTREATMENT SYSTEM WITH MULTIPLE DOSING MODULES

CROSS-REFERENCE TO RELATED APPLICATION

The present application is a National Phase Application of PCT/CN2019/071269, filed Jan. 11, 2019, the contents of which are hereby incorporated by reference in their entirety.

TECHNICAL FIELD

The present application relates generally to an aftertreatment system with multiple dosing modules.

BACKGROUND

For internal combustion engines, such as diesel engines, nitrogen oxide ($NO_x$) compounds may be emitted in the engine exhaust. To reduce $NO_x$ emissions, a reductant may be dosed into the exhaust by a dosing system. The dosing system includes an injector through which the reductant is dosed into the exhaust.

In order to facilitate mixing of reductant injected into exhaust gas using the injector, many dosing control systems include an application-specific separate mixer, which is more expensive and complicated than a simple more scalable mixer. The mixer may be selected specifically for a particular dosing control system and is designed to break down the reductant via structural flow altering features (e.g., vanes, etc.). As the exhaust gas flows over these structural flow altering features, swirl may be impacted on the exhaust gas to facilitate mixing. If the mixer does not effectively break down the reductant, deposits can form or undesirable byproducts may be emitted, thereby causing such dosing control systems to be undesirable.

SUMMARY

Implementations herein relate to an aftertreatment system that includes two individually controllable dosing modules that are coupled to a decomposition chamber such that break down of reductant is facilitated without an expensive and complicated mixer. Instead, the dosing modules are oriented at various angles to cause either collision of the reductant injected from the dosing modules or to cause swirling of the reductant within the decomposition chamber. In this way, embodiments of the aftertreatment system described herein are capable of desirably breaking down reductant without a specialized mixer, thereby facilitating cost savings and increasing the adaptability of the aftertreatment system to various applications (e.g., decomposition chambers of different diameters, etc.). Further, embodiments of the aftertreatment systems described here may allow for simpler and more scalable mixers to be used.

In one embodiment, an aftertreatment system includes a decomposition chamber, a reductant pump, a first dosing module, a second dosing module, and a controller. The first dosing module is coupled to the decomposition chamber and configured to receive reductant from the reductant pump. The second dosing module is coupled to the decomposition chamber and configured to receive reductant from the reductant pump independent of the first dosing module. The controller is communicatively coupled to the first dosing module and the second dosing module. The controller is configured to independently control a first volumetric flow rate of reductant provided from the first dosing module into the decomposition chamber and a second volumetric flow rate of reductant provided from the second dosing module into the decomposition chamber.

In another embodiment, an aftertreatment system includes a decomposition chamber, a first dosing module, a second dosing module, and a controller. The first dosing module is coupled to the decomposition chamber and configured to receive reductant. The second dosing module is coupled to the decomposition chamber and configured to receive reductant. The controller is communicatively coupled to the first dosing module and the second dosing module. The controller is configured to selectively activate and deactivate the first dosing module and the second dosing module. The first dosing module is configured to provide reductant into the decomposition chamber along a first trajectory when activated. The second dosing module is configured to provide reductant into the decomposition chamber along a second trajectory when activated. The first dosing module and the second dosing module are coupled to the decomposition chamber such that: (i) the first trajectory and the second trajectory intersect within the decomposition chamber or (ii) the first trajectory and the second trajectory form offset swirls that do not intersect within the decomposition chamber.

In yet another embodiment, an aftertreatment system includes a decomposition chamber, a first dosing module, a second dosing module, and a controller. The first dosing module is coupled to the decomposition chamber and configured to receive reductant. The second dosing module is coupled to the decomposition chamber and configured to receive reductant. The controller is communicatively coupled to the first dosing module and the second dosing module. The controller is configured to selectively activate and deactivate the first dosing module and the second dosing module. The first dosing module is configured to provide reductant into the decomposition chamber and is coupled to the decomposition chamber such that reductant provided from the first dosing module is provided along a first trajectory within the decomposition chamber and dispersed into exhaust gases within the decomposition chamber along the first trajectory. The second dosing module is configured to provide reductant into the decomposition chamber and is coupled to the decomposition chamber such that reductant provided from the second dosing module is provided along a second trajectory within the decomposition chamber and dispersed into exhaust gases within the decomposition chamber along the second trajectory. The second trajectory is different from the first trajectory.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for utilizing multiple dosing modules in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a dosing control system within an aftertreatment system. Dosing control systems inject reductant into exhaust gas within an exhaust conduit using an injector.

II. Overview of Example Aftertreatment System

Figure 1:
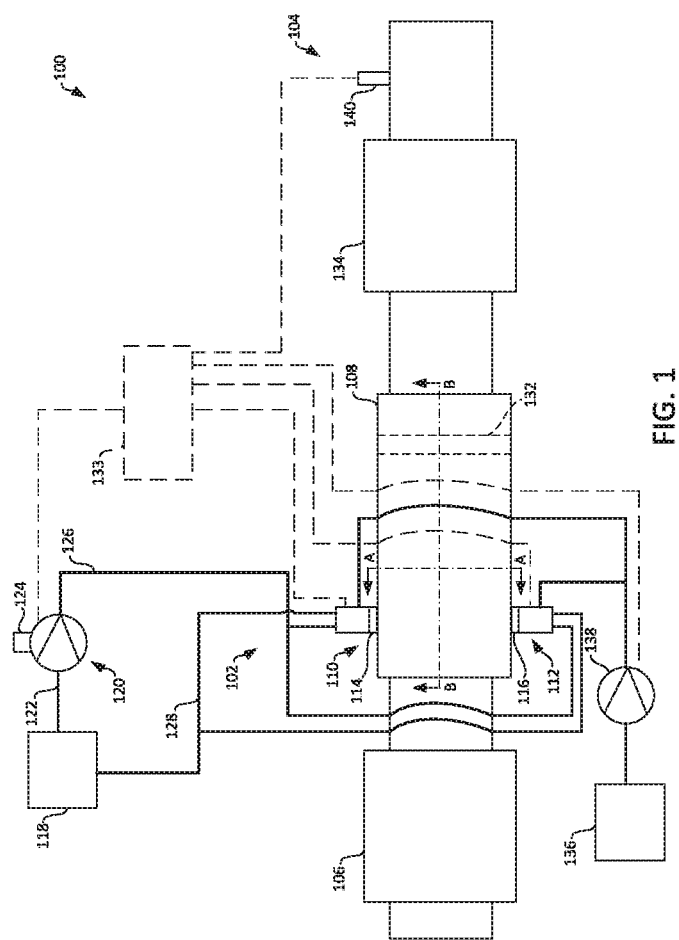
FIG. 1 is a block schematic diagram of an example aftertreatment system for an internal combustion engine.

FIG. 1 depicts an aftertreatment system 100 having an example reductant delivery system 102 for an exhaust system 104. The aftertreatment system 100 also includes a particulate filter (e.g., a diesel particulate filter (DPF)) 106. The particulate filter 106 is configured to (e.g., structured to, able to, etc.) remove particulate matter, such as soot, from exhaust gas flowing in the exhaust system 104. The particulate filter 106 includes an inlet and an outlet. The inlet of the particulate filter 106 receives exhaust gas from an exhaust manifold of an internal combustion engine (e.g., diesel internal combustion engine, bi-fuel internal combustion engine, dual fuel internal combustion engine, hybrid internal combustion engine, etc.). The outlet of the particulate filter 106 provides the exhaust gas to downstream components of the aftertreatment system 100 after having particulate matter substantially filtered from the exhaust gas and/or converting the particulate matter into carbon dioxide. In some implementations, the particulate filter 106 may be omitted.

The aftertreatment system 100 also includes a decomposition chamber 108 (e.g., reactor, reactor pipe, decomposition reactor, etc.). The decomposition chamber 108 includes an inlet that is in fluid communication with the particulate filter 106 to receive the exhaust gas containing $NO_x$ emissions. The decomposition chamber 108 is configured to convert a reductant into ammonia. The reductant may be, for example, urea, diesel exhaust fluid (DEF), an urea water solution (UWS), an aqueous urea solution (e.g., AUS32, etc.), and other similar fluids.

The decomposition chamber 108 includes the reductant delivery system 102. The reductant delivery system 102 includes a first dosing module 110 (e.g., doser, etc.) and a second dosing module 112. Each of the first dosing module 110 and the second dosing module 112 is independently coupled to the decomposition chamber 108 and configured to independently dose (e.g., inject, propel, expel, etc.) reductant into the decomposition chamber 108.

Unlike other aftertreatment systems that only include a single doser, the first dosing module 110 and the second dosing module 112 are independently coupled to the decomposition chamber 108 and are configured to independently dose reductant into the decomposition chamber 108 along target trajectories (e.g., flow paths, etc.) within the decomposition chamber. After being dosed into the decomposition chamber 108, the reductant undergoes evaporation, thermolysis, and hydrolysis to form gaseous ammonia within the exhaust system 104.

The first dosing module 110 and the second dosing module 112 dose reductant into the decomposition chamber 108 along target trajectories such that a uniformity index (UI) of the reductant in the exhaust gas is increased and/or such that formation of reductant deposits within the decomposition chamber 108 is minimized. Increases in the UI of the reductant in the exhaust gas facilitate increases in the formation of gaseous ammonia and corresponding decreases in the formation of reductant deposits within the exhaust system 104 and in the emission of undesirable byproducts from the exhaust system 104. By reducing the formation of reductant deposits within the decomposition chamber 108, the decomposition chamber 108 may continue to operate desirably for a longer period of time than other systems that do not mitigate deposits.

The aftertreatment system 100 is capable of obtaining a target UI of the reductant within the exhaust gas without a relatively expensive and/or complex mixer due to the target trajectories of the first dosing module 110 and the second dosing module 112. In this way, the first dosing module 110 and the second dosing module 112 cause the aftertreatment system 100 to be more desirable than other systems that require relatively expensive and/or complex mixers to obtain a target UI of the reductant within the exhaust gas. Additionally, the aftertreatment system 100 may provide a lower backpressure to an internal combustion engine than a system with a relatively expensive and/or complex mixer, thereby facilitating an increase in fuel efficiency of the internal combustion engine compared to the system with a relatively expensive and/or complex mixer.

By variously positioning the first dosing module 110 and second dosing module 112 on the decomposition chamber 108, as variously shown in FIGS. 2-8, the trajectories of the first dosing module 110 and the second dosing module 112 can be changed such that a target UI of the reductant within the exhaust gas can be obtained. In some embodiments, the first dosing module 110 and the second dosing module 112 are positioned based on a diameter of the decomposition chamber 108. For example, where the diameter of the decomposition chamber 108 is relatively small (e.g., 3 inches, 5 inches, 6 inches, 10 inches, etc.), the first dosing module 110 and the second dosing module 112 may have trajectories that intersect so as to cause collision of reductant injected from the first dosing module 110 and reductant injected from the second dosing module 112. In another example, where the diameter of the decomposition chamber 108 is relatively large (e.g., 22 inches, 20 inches, 18 inches, 15 inches, etc.), the first dosing module 110 and the second dosing module 112 may have trajectories that do not intersect so as to cause the reductant injected from the first dosing module 110 and the reductant injected within the second dosing module 112 to separately swirl within the decomposition chamber 108.

The first dosing module 110 and the second dosing module 112 facilitate streamlined tailoring of the aftertreatment system 100 to a target application because the first dosing module 110 and the second dosing module 112 are individually controllable. Specifically, the volumetric flow rate of reductant provided by the first dosing module 110 into the decomposition chamber 108 may be controlled independently of the volumetric flow rate of reductant provided by the second dosing module 112 into the decomposition chamber 108. In this way, the aftertreatment system 100 may be tailored to a target application by simply altering the control of the first dosing module 110 and the second dosing module 112, rather than installing a mixer specifically designed for a specific application, thereby causing the aftertreatment system 100 to be more desirable than other systems that require installation of application-specific mixers.

While the reductant delivery system 102 is described herein as including two dosing modules, it is understood that the reductant delivery system 102 may similarly include three, four, five, six, or more dosing modules. The positioning of the first dosing module 110 and the second dosing module 112 relative to the decomposition chamber 108 is illustrative only, and it is understood that the first dosing module 110 and the second dosing module 112 may be coupled to the decomposition chamber 108 in various other configurations.

The first dosing module 110 may include a first insulator 114 interposed between a portion of the first dosing module 110 and the portion of the decomposition chamber 108 on which the first dosing module 110 is coupled. The first insulator 114 is configured to isolate at least a portion of the first dosing module 110 from heat and/or vibrations from the decomposition chamber 108.

The second dosing module 112 may include a second insulator 116 interposed between a portion of the second dosing module 112 and the portion of the decomposition chamber 108 on which the second dosing module 112 is coupled. The second insulator 116 is configured to isolate at least a portion of the second dosing module 112 from heat and/or vibrations from the decomposition chamber 108.

The reductant delivery system 102 includes a reductant source 118. The reductant source 118 may include multiple reductant sources 118. The reductant source 118 may be, for example, a diesel exhaust fluid tank containing urea. The reductant source 118 is fluidly coupled to (e.g., fluidly configured to communicate with, etc.) a reductant pump 120 (e.g., reductant supply unit, centrifugal pump, positive displacement pump, etc.) via a reductant suction conduit 122 (e.g., line, pipe, etc.). The reductant pump 120 is used to draw reductant from the reductant source 118 and to pressurize the reductant from the reductant source 118. In some embodiments, the reductant pump 120 is pressure-controlled (e.g., controlled to obtain a target pressure, etc.). In some embodiments, the reductant pump 120 is coupled to a chassis of a vehicle (e.g., maritime vehicle, boat, shipping boat, barge, container ship, terrestrial vehicle, construction vehicle, truck, etc.) associated with the aftertreatment system 100.

The reductant pump 120 may include a filter 124. The filter 124 filters (e.g., strains, etc.) the reductant prior to the reductant being provided to internal components (e.g., pistons, vanes, etc.) of the reductant pump 120. For example, the filter 124 may inhibit or prevent the transmission of solids (e.g., solidified reductant, contaminants, etc.) to the internal components of the reductant pump 120. In this way, the filter 124 may facilitate prolonged desirable operation of the reductant pump 120.

The reductant delivery system 102 also includes a reductant delivery conduit 126 that is fluidly coupled to the reductant pump 120, the first dosing module 110, and the second dosing module 112. The reductant delivery conduit 126 is configured to provide reductant from the reductant pump 120 to the first dosing module 110 and the second dosing module 112.

The reductant delivery system 102 also includes a reductant return conduit 128 that is fluidly coupled to the reductant source 118, the first dosing module 110, and the second dosing module 112. The reductant return conduit 128 is configured to receive reductant (e.g., backflow, etc.) from the first dosing module 110 and the second dosing module 112 and return the reductant into the reductant source 118 (e.g., for reuse, etc.).

In an exemplary embodiment, the reductant delivery system 102 only includes a single reductant pump 120 and does not include multiple pumps, where each of the multiple pumps is associated with only one of the first dosing module 110 and the second dosing module 112. Instead, the reductant pump 120 provides reductant to both the first dosing module 110 and the second dosing module 112 (via two separate ports on the reductant delivery conduit 126) and is configured to receive reductant from both the first dosing module 110 and the second dosing module 112 (via two separate ports on the reductant return conduit 128).

The aftertreatment system 100 also includes a mixer 132 disposed within the decomposition chamber 108 downstream of the first dosing module 110 and the second dosing module 112. The mixer 132 may be a simple and readily scalable mixer (e.g., a vane plate mixer, etc.). The mixer 132 is configured to mix the exhaust gas received from the particulate filter 106 and the reductant received from the first dosing module 110 and the second dosing module 112 such that the reductant is dispersed within the exhaust gas (e.g., forming a substantially homogenous mixture of the reductant and the exhaust gas, etc.).

The reductant delivery system 102 also includes a controller 133. The controller 133 is electrically or communicatively coupled to the first dosing module 110, the second dosing module 112, and the reductant pump 120. The controller 133 is configured to control the first dosing module 110 and the second dosing module 112 to dose the reductant into the decomposition chamber 108 according to a dosing schedule.

The controller 133 may also be configured to control the reductant pump 120. The controller 133 may include a microprocessor, an application-specific integrated circuit (ASIC), a field-programmable gate array (FPGA), etc., or combinations thereof. The controller 133 may include memory, which may include, but is not limited to, electronic, optical, magnetic, or any other storage or transmission device capable of providing a processor, ASIC, FPGA, etc. with program instructions. This memory may include a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

The aftertreatment system 100 also includes a selective catalytic reduction (SCR) catalyst 134. The SCR catalyst 134 is configured to receive the exhaust gas, $NO_x$ emissions, ammonia, and/or reductant from the decomposition chamber 108. The SCR catalyst 134 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 134 includes an inlet in fluid communication with the decomposition chamber 108 from which exhaust gas and reductant are received and an outlet in fluid communication with an outlet of the exhaust system 104 (e.g., the SCR catalyst 134 is immediately upstream of a muffler, etc.).

The exhaust system 104 may further include an oxidation catalyst (e.g., a diesel oxidation catalyst (DOC)) in fluid communication with the exhaust system 104 (e.g., downstream of the SCR catalyst 134 or upstream of the particulate filter 106) to oxidize hydrocarbons and carbon monoxide in the exhaust gas.

In some implementations, the particulate filter 106 may be positioned downstream of the decomposition chamber 108 (e.g., downstream of the decomposition chamber 108 and upstream of the SCR catalyst 134, downstream of the decomposition chamber 108 and the SCR catalyst 134, etc.). For instance, the particulate filter 106 and the SCR catalyst 134 may be combined into a single unit.

In some embodiments, the reductant delivery system 102 includes an air source 136 (e.g., air intake, air box, air filter, etc.) and an air pump 138 (e.g., fan, etc.). The air pump 138 is configured to draw air from the air source 136 and provide the air to the first dosing module 110 and the second dosing module 112. In such embodiments, the first dosing module 110 and the second dosing module 112 are configured to mix reductant from the reductant source 118 with air from the air source 136 and deliver an air-reductant mixture into the decomposition chamber 108.

In some embodiments, the aftertreatment systems 100 includes a sensor 140 that is electrically or communicatively coupled to the controller 133. In such embodiments, the sensor 140 is coupled to the exhaust system 104 to detect a condition of the exhaust gas flowing through the exhaust system 104. In some implementations, the sensor 140 may have a portion disposed within the exhaust system 104; for example, a tip of the sensor 140 may extend into a portion of the exhaust system 104. In other implementations, the sensor 140 may receive exhaust gas through another conduit, such as one or more sample pipes extending from the exhaust system 104. While the sensor 140 is depicted as positioned downstream of the SCR catalyst 134, it should be understood that the sensor 140 may be positioned at any other position of the exhaust system 104, including upstream of the particulate filter 106, within the particulate filter 106, between the particulate filter 106 and the decomposition chamber 108, within the decomposition chamber 108, between the decomposition chamber 108 and the SCR catalyst 134, within the SCR catalyst 134, or downstream of the SCR catalyst 134. In addition, two or more sensors 140 may be utilized for detecting a condition of the exhaust gas, such as two, three, four, five, or six sensors 140 with each sensor 140 located at one of the aforementioned positions of the exhaust system 104.

Figure 2:
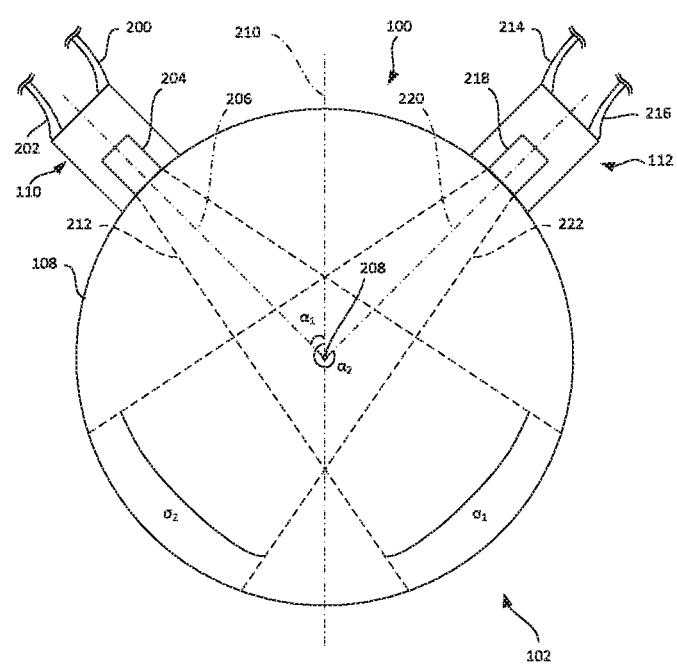
FIG. 2 is a cross-sectional view of a portion of the example aftertreatment system shown in FIG. 1, taken along plane A-A.

FIG. 2 illustrates a cross-section of the decomposition chamber 108 taken along plane A-A of FIG. 1. The first dosing module 110 includes a first input 200 (e.g., input connector, input connection, etc.) and a first output 202 (e.g., output connector, output connection, etc.). The first input 200 is coupled to the reductant delivery conduit 126 and the first output 202 is coupled to the reductant return conduit 128. While not shown in FIG. 2, it is understood that the first dosing module 110 may also include an inlet for receiving air from the air pump 138 (e.g., if the aftertreatment system 100 includes the air pump 138, etc.). The first dosing module 110 also includes a first injector 204. The first injector 204 is configured to receive the reductant from the first input 200 and to dose the reductant into the decomposition chamber 108.

The first injector 204 is centered on a first injector central axis 206. The decomposition chamber 108 is centered on a decomposition chamber central axis 208 and bisected by a decomposition chamber vertical axis 210. In some embodiments, the first injector central axis 206 symmetrically divides the first injector 204 and/or the first dosing module 110. In some embodiments, the decomposition chamber vertical axis 210 symmetrically divides the decomposition chamber 108. In various embodiments, the first injector 204 is located on one side (e.g., left side, right side, etc.) of the decomposition chamber vertical axis 210 and the second injector 206 is located on the other side (e.g., right side, left side, etc.) of the decomposition chamber vertical axis 210.

The first injector central axis 206 intersects the decomposition chamber vertical axis 210 at the decomposition chamber central axis 208 such that the first injector central axis 206 is separated from the decomposition chamber vertical axis 210 by a first injector axis angle $\alpha_1$. The first injector 204 is configured to spray reductant in a first spray cone 212 having a first injector spray angle $\sigma_1$ (e.g., alpha angle, spray cone angle, cone angle, etc.). The first spray cone 212 is a region where reductant dosed by the first injector 204 would be concentrated absent the effects from flow of the exhaust gas and of gravity on the reductant as it is dosed from the first injector 204.

The second dosing module 112 includes a second input 214 (e.g., input connector, input connection, etc.) and a second output 216 (e.g., output connector, output connection, etc.). The second input 214 is coupled to the reductant delivery conduit 126, and the second output 216 is coupled to the reductant return conduit 128. While not shown in FIG. 2, it is understood that the second dosing module 112 may also include an inlet for receiving air from the air pump 138 (e.g., if the aftertreatment system 100 includes the air pump 138, etc.). The second dosing module 112 also includes a second injector 218. The second injector 218 is configured to receive the reductant from the second input 214 and to dose the reductant into the decomposition chamber 108.

The second injector 218 is centered on a second injector central axis 220. In some embodiments, the second injector central axis 220 symmetrically divides the second injector 218 and/or the second dosing module 112. The second injector central axis 220 intersects the decomposition chamber vertical axis 210 at the decomposition chamber central axis 208 such that the second injector central axis 220 is separated from the decomposition chamber vertical axis 210 by a second injector axis angle $\alpha_2$. The second injector 218 is configured to spray reductant in a second spray cone 222 having a second injector spray angle $\sigma_2$. The second spray cone 222 is a region where reductant dosed by the second injector 218 would be concentrated absent the effects from flow of the exhaust gas and of gravity on the reductant as it is dosed from the second injector 218.

Each of the first injector axis angle $\alpha_1$, the first injector spray angle $\sigma_1$, the second injector axis angle $\alpha_2$, and the second injector spray angle $\sigma_2$ is capable of being independently selected by variously coupling the first dosing module 110 and the second dosing module 112 to the decomposition chamber 108 and by variously selecting the first injector 204 and the second injector 218, such that the reductant delivery system 102 is tailored for a target application. In some embodiments, the first injector axis angle $\alpha_1$ is equal to 360° less the second injector axis angle $\alpha_2$ ($\alpha_1=360°-\alpha_2$), and the first injector spray angle $\sigma_1$ is equal to the second injector spray angle $\sigma_2$. In some embodiments, the first injector axis angle $\alpha_1$ is approximately equal (e.g., within 5% of, etc.) to the second injector axis angle $\alpha_2$. In these embodiments, the first injector 204 is aligned with the second injector 218 along an axis that is substantially parallel to the decomposition chamber center axis 208 such that a spacing (e.g., one inch, three inches, ten inches, etc.) exists between the first injector 204 and the second injector 218.

In some embodiments, the first injector axis angle $\alpha_1$ is between 0° and 90°, inclusive (e.g., including 0°, including 90°, etc.), and the second injector axis angle $\alpha_2$ is between 270° and 360°, inclusive. In other embodiments, the first injector axis angle $\alpha_1$ is between 0° and 90°, inclusive, and the second injector axis angle $\alpha_2$ is between 0° and 90°, inclusive.

In various embodiments, each of the first injector axis angle $\alpha_1$, the first injector spray angle $\sigma_1$, the second injector axis angle $\alpha_2$, and the second injector spray angle $\sigma_2$ is selected such that the first spray cone 212 and the second spray cone 222 overlap. In this way, reductant dosed into the decomposition chamber 108 from the first injector 204 may contact (e.g., interface with, strike, collide with, etc.) reductant dosed into the decomposition chamber 108 from the second injector 218. This contact may cause the reductant to break up (e.g., to separate into smaller droplets, etc.), thereby facilitating increased dispersion of the reductant in the exhaust gas.

III. First Example Reductant Delivery System

Figure 3:
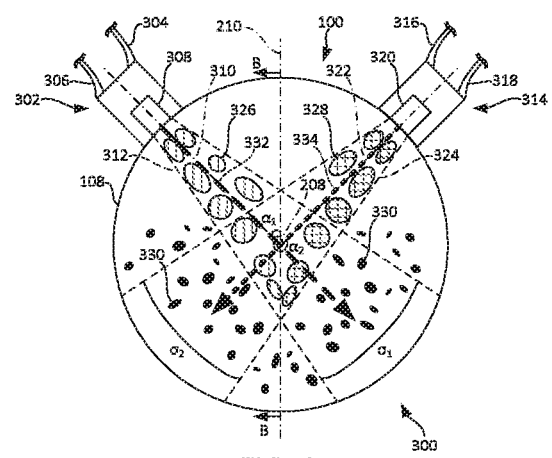
FIG. 3 is cross-sectional view of a portion of the example aftertreatment system shown in FIG. 1, taken along plane A-A, having an example reductant delivery system.

FIG. 3 illustrates an example reductant delivery system 300 implemented in the aftertreatment system 100 and shown via a cross-section of the decomposition chamber 108 taken along plane A-A of FIG. 1. The reductant delivery system 300 is the reductant delivery system 102 in one embodiment. Accordingly, the foregoing description of the reductant delivery system 102 applies to the reductant delivery system 300.

The reductant delivery system 300 includes a first dosing module 302. The foregoing description of the first dosing module 110 applies to the first dosing module 302. The first dosing module 302 includes a first input 304 and a first output 306. The first input 304 is coupled to the reductant delivery conduit 126, and the first output 306 is coupled to the reductant return conduit 128. While not shown in FIG. 3, it is understood that the first dosing module 302 may also include an inlet for receiving air from the air pump 138. The first dosing module 302 also includes a first injector 308. The first injector 308 is configured to receive the reductant from the first input 304 and to dose the reductant into the decomposition chamber 108.

The first injector 308 is centered on (e.g., divided by, etc.) a first injector central axis 310. The first injector central axis 310 intersects the decomposition chamber vertical axis 210 at the decomposition chamber central axis 208 such that the first injector central axis 310 is separated from the decomposition chamber vertical axis 210 by a first injector axis angle $\alpha_1$. The first injector 308 is configured to spray reductant in a first spray cone 312 having a first injector spray angle $\sigma_1$. The first spray cone 312 is a region where reductant dosed by the first injector 308 would be concentrated absent the effects from flow of the exhaust gas and of gravity on the reductant as it is dosed from the first injector 308.

The reductant delivery system 300 includes a second dosing module 314. The foregoing description of the second dosing module 112 applies to the second dosing module 314. The second dosing module 314 includes a second input 316 and a second output 318. The second input 316 is coupled to the reductant delivery conduit 126, and the second output 318 is coupled to the reductant return conduit 128. While not shown in FIG. 3, it is understood that the second dosing module 314 may also include an inlet for receiving air from the air pump 138. The second dosing module 314 also includes a second injector 320. The second injector 320 is configured to receive the reductant from the second input 316 and to dose the reductant into the decomposition chamber 108.

The second injector 320 is centered on a second injector central axis 322. In some embodiments, the second injector central axis 322 symmetrically divides the second injector 320 and/or the second dosing module 314. The second injector central axis 322 intersects the decomposition chamber vertical axis 210 at the decomposition chamber central axis 208 such that the second injector central axis 322 is separated from the decomposition chamber vertical axis 210 by a second injector axis angle $\alpha_2$. The second injector 320 is configured to spray reductant in a second spray cone 324 having a second injector spray angle $\sigma_2$. The second spray cone 324 is a region where reductant dosed by the second injector 320 would be concentrated absent the effects from flow of the exhaust gas and of gravity on the reductant as it is dosed from the second injector 320.

In FIG. 3, the first injector axis angle $\alpha_1$ is equal to 360° less the second injector axis angle $\alpha_2$ and the first injector spray angle $\sigma_1$ is equal to the second injector spray angle $\sigma_2$. In some embodiments, the first injector axis angle $\alpha_1$ is equal to 35°, the second injector axis angle $\alpha_2$, is equal to 325°, the first injector spray angle $\sigma_1$ is equal to 40°, and the second injector spray angle $\sigma_2$ is equal to 40°. In various embodiments, the first injector axis angle $\alpha_1$ is equal to between 5° and 90°, inclusive. In other embodiments, the first injector axis angle $\alpha_1$ is equal to between 0° and 45°, inclusive. In still other embodiments, the first injector axis angle cu is equal to between 45° and 90°, inclusive. In various embodiments, the second injector axis angle $\alpha_2$ is equal to between 270° and 355°, inclusive. In other embodiments, the second injector axis angle $\alpha_2$ is equal to between 315° and 360°, inclusive. In still other embodiments, the second injector axis angle $\alpha_2$ is equal to between 270° and 315°, inclusive. In various embodiments, the first injector spray angle $\sigma_1$ is equal to between 10° and 30°, inclusive. In other embodiments, the first injector spray angle $\sigma_1$ is equal to between 5° and 45°, inclusive. In still other embodiments, the first injector spray angle $\sigma_1$ is equal to between 25° and 40°, inclusive. In various embodiments, the second injector spray angle $\sigma_2$ is equal to between 10° and 30°, inclusive. In other embodiments, the second injector spray angle $\sigma_2$ is equal to between 5° and 45°, inclusive. In still other embodiments, the second injector spray angle $\sigma_2$ is equal to between 25° and 40°, inclusive.

As shown in FIG. 3, large reductant droplets 326 are dosed from the first injector 308 along the first injector central axis 310 towards the decomposition chamber 108 and large reductant droplets 328 are dosed from the second injector 320 along the second injector central axis 322 towards the decomposition chamber 108. When the large reductant droplets 326 contact the large reductant droplets 328, small reductant droplets 330 are formed from the large reductant droplets 326 and the large reductant droplets 328 due to the contact therebetween. As also shown in FIG. 3, this contact may cause some of the small reductant droplets 330 to be propelled out of the first spray cone 312 and the second spray cone 324.

FIG. 3 also illustrates a first trajectory 332 and a second trajectory 334. The first trajectory 332 is different from the second trajectory 334. The first trajectory 332 illustrates the flow of the reductant dosed into the decomposition chamber 108 from the first injector 308. Similarly, the second trajectory 334 illustrates the flow of the reductant dosed into the decomposition chamber 108 from the second injector 320. The first dosing module 302 and the second dosing module 314 are each coupled to the decomposition chamber 108 such that the first trajectory 332 and the second trajectory 334 intersect proximate the decomposition chamber central axis 208. This collision facilitates additional decomposition (e.g., mixing, etc.) of the reductant in the exhaust gas, thereby increasing the UI of the reductant within the exhaust gas.

Figure 4:
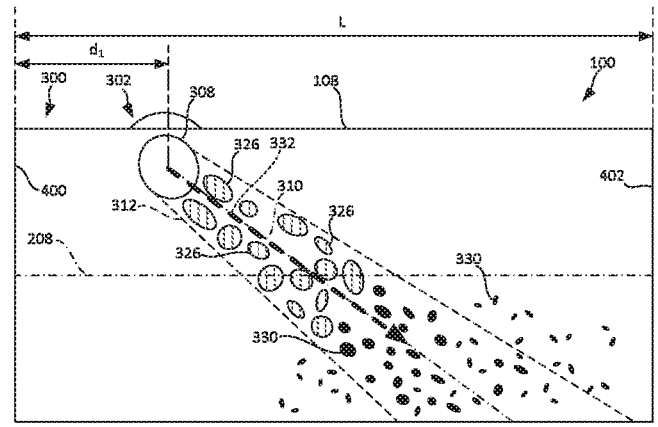
FIG. 4 is a side cross-sectional view of the portion of the example aftertreatment system shown in FIG. 3, taken along plane B-B.

FIG. 4 illustrates the reductant delivery system 300 via a cross-section of the decomposition chamber 108 taken along plane B-B of FIG. 3. In FIG. 4, the flow of the exhaust gas is from a decomposition chamber inlet 400 to a decomposition chamber outlet 402. The decomposition chamber inlet 400 is separated from the decomposition chamber outlet 402 by a decomposition chamber length L. Aside from being coupled to the decomposition chamber 108 at the first injector axis angle $\alpha_1$, the first dosing module 302 is also coupled to the decomposition chamber 108 such that the first injector central axis 310 is disposed a first injector distance $d_1$ from the decomposition chamber inlet 400. The first injector distance $d_1$ is equal to a fraction of the decomposition chamber length L. In some embodiments, the first injector distance $d_1$ is equal to approximately ⅙ of the decomposition chamber length L.

While not shown in FIG. 4, it is understood that the second dosing module 314 is similarly coupled to the decomposition chamber 108 such that the second injector 320 is disposed a second injector distance $d_2$ from the decomposition chamber inlet 400. In some embodiments, the first injector distance $d_1$ is equal to the second injector distance $d_2$. However, in other embodiments, the first injector distance $d_1$ is different from (e.g., greater than, less than, etc.) the second injector distance $d_2$.

IV. Second Example Reductant Delivery System

Figure 5:
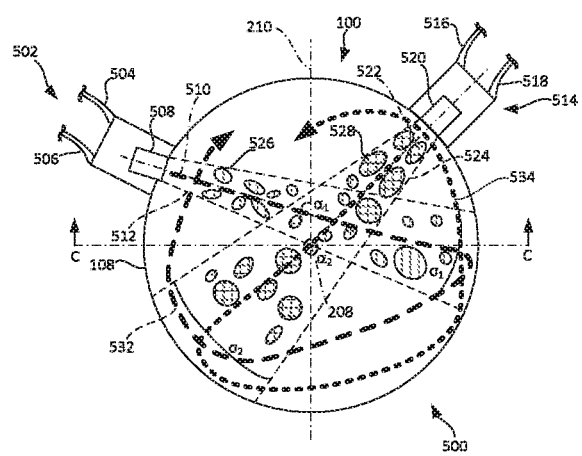
FIG. 5 is cross-sectional view of a portion of the example aftertreatment system shown in FIG. 1, taken along plane A-A, having another example reductant delivery system.

FIG. 5 illustrates an example reductant delivery system 500 implemented in the aftertreatment system 100 and shown via a cross-section of the decomposition chamber 108 taken along plane A-A of FIG. 1. In one embodiment, the reductant delivery system 500 is the reductant delivery system 102. Accordingly, the foregoing description of the reductant delivery system 102 applies to the reductant delivery system 500.

The reductant delivery system 500 includes a first dosing module 502. The foregoing description of the first dosing module 110 applies to the first dosing module 502. The first dosing module 502 includes a first input 504 and a first output 506. The first input 504 is coupled to the reductant delivery conduit 126, and the first output 506 is coupled to the reductant return conduit 128. While not shown in FIG. 5, it is understood that the first dosing module 502 may also include an inlet for receiving air from the air pump 138. The first dosing module 502 also includes a first injector 508. The first injector 508 is configured to receive the reductant from the first input 504 and to dose the reductant into the decomposition chamber 108.

The first injector 508 is centered on (e.g., divided by, etc.) a first injector central axis 510. The first injector central axis 510 intersects the decomposition chamber vertical axis 210 above the decomposition chamber central axis 208 such that the first injector central axis 510 is separated from the decomposition chamber vertical axis 210 by a first injector axis angle cu. The first injector 508 is configured to spray reductant in a first spray cone 512 having a first injector spray angle $\sigma_1$. The first spray cone 512 is a region where reductant dosed by the first injector 508 would be concentrated absent the effects from flow of the exhaust gas and of gravity on the reductant as it is dosed from the first injector 508.

The reductant delivery system 500 includes a second dosing module 514. The foregoing description of the second dosing module 112 applies to the second dosing module 514. The second dosing module 514 includes a second input 516 and a second output 518. The second input 516 is coupled to the reductant delivery conduit 126, and the second output 518 is coupled to the reductant return conduit 128. While not shown in FIG. 5, it is understood that the second dosing module 514 may also include an inlet for receiving air from the air pump 138. The second dosing module 514 also includes a second injector 520. The second injector 520 is configured to receive the reductant from the second input 516 and to dose the reductant into the decomposition chamber 108.

The second injector 520 is centered on a second injector central axis 522. In some embodiments, the second injector central axis 522 symmetrically divides the second injector 520 and/or the second dosing module 514. The second injector central axis 522 intersects the decomposition chamber vertical axis 210 at the decomposition chamber central axis 208 such that the second injector central axis 522 is separated from the decomposition chamber vertical axis 210 by a second injector axis angle $\alpha_2$. The second injector 520 is configured to spray reductant in a second spray cone 524 having a second injector spray angle $\sigma_2$. The second spray cone 524 is a region where reductant dosed by the second injector 520 would be concentrated absent the effects from flow of the exhaust gas and of gravity on the reductant as it is dosed from the second injector 520.

In FIG. 5, the first injector axis angle $\alpha_1$ is greater than 360° less the second injector axis angle $\alpha_2$ ($\alpha_1 > 360° - \alpha_2$), and the first injector spray angle $\sigma_1$ is equal to the second injector spray angle $\sigma_2$. In some embodiments, the first injector axis angle $\alpha_1$ is equal to 65°, the second injector axis angle $\alpha_2$, is equal to 305°. In some embodiments, the first injector spray angle $\sigma_1$ is equal to 45° and the second injector spray angle $\sigma_2$ is equal to 45°.

As shown in FIG. 5, large reductant droplets 526 are dosed from the first injector 508 along the first injector central axis 510 towards the decomposition chamber 108 and large reductant droplets 528 are dosed from the second injector 520 along the second injector central axis 522 towards the decomposition chamber 108. The large reductant droplets 526 and the large reductant droplets 528 do not contact each other (e.g., underneath the first injector 508 and the second injector 520, etc.). Instead, the large reductant droplets 526 and the large reductant droplets 528 independently break down into small reductant droplets 530 downstream of the first injector 508 and the second injector 520, as shown in FIG. 6.

FIG. 5 also illustrates a first trajectory 532 and a second trajectory 534. The first trajectory 532 is different from the second trajectory 534. The first trajectory 532 illustrates the flow of the reductant dosed into the decomposition chamber 108 from the first injector 508. Similarly, the second trajectory 534 illustrates the flow of the reductant dosed into the decomposition chamber 108 from the second injector 520. The first trajectory 532 intersects the second trajectory 534. At this intersection, reductant provided from the first injector 508 may collide with reductant provided from the second injector 520, thereby breaking down large reductant droplets into smaller reductant droplets within the exhaust gas.

The first dosing module 502 and the second dosing module 514 are each coupled to the decomposition chamber 108 such that the first trajectory 532 and the second trajectory 534 each form a helical (e.g., corkscrew, spiral, etc.) swirl (e.g., spin, rotation, etc.) within the decomposition chamber 108 in opposing directions. This swirl facilitates additional decomposition of the reductant in the exhaust gas, thereby increasing the UI of the reductant within the exhaust gas.

Figure 6:
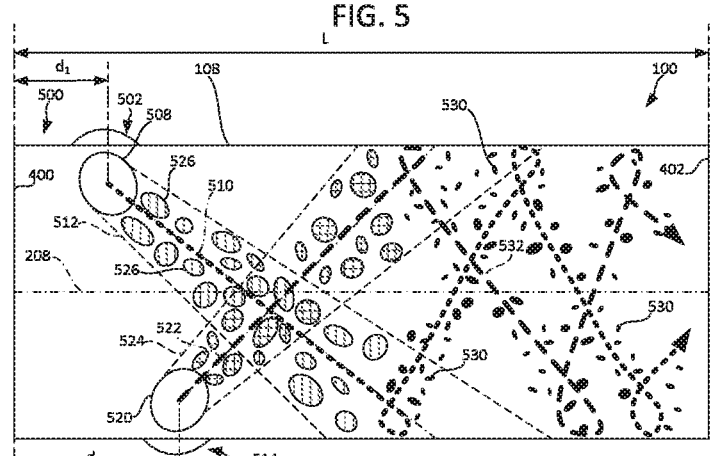
FIG. 6 is a side cross-sectional view of the portion of the example aftertreatment system shown in FIG. 5, taken along plane C-C.

FIG. 6 illustrates the reductant delivery system 500 via a cross-section of the decomposition chamber 108 taken along plane C-C of FIG. 5. In FIG. 6, the flow of the exhaust gas is from the decomposition chamber inlet 400 to the decomposition chamber outlet 402. Aside from being coupled to the decomposition chamber 108 at the first injector axis angle $\alpha_1$, the first dosing module 502 is also coupled to the decomposition chamber 108 such that the first injector central axis 510 is disposed a first injector distance $d_1$ from the decomposition chamber inlet 400. The first injector distance $d_1$ is equal to a fraction of the decomposition chamber length L. In some embodiments, the first injector distance $d_1$ is equal to approximately 1/10 of the decomposition chamber length L. Aside from being coupled to the decomposition chamber 108 at the second injector axis angle $\alpha_2$, the second dosing module 514 is also coupled to the decomposition chamber 108 such that the second injector central axis 522 is disposed a second injector distance $d_2$ from the decomposition chamber inlet 400. The second injector distance $d_2$ is equal to a fraction of the decomposition chamber length L. In some embodiments, the second injector distance $d_2$ is equal to approximately 2/5 of the decomposition chamber length L.

The first trajectory 532 and the second trajectory 534 are also shown in FIG. 6. Due to the difference between the first injector distance $d_1$ and the second injector distance $d_2$, the swirl produced by the first trajectory 532 is offset from the swirl produced by the second trajectory 534, thereby facilitating increased mixing between the reductant and the exhaust gas. In FIG. 6, the first injector distance $d_1$ and the second injector distance $d_2$ prevent interference between the first trajectory 532 and the second trajectory 534.

V. Third Example Reductant Delivery System

Figure 7:
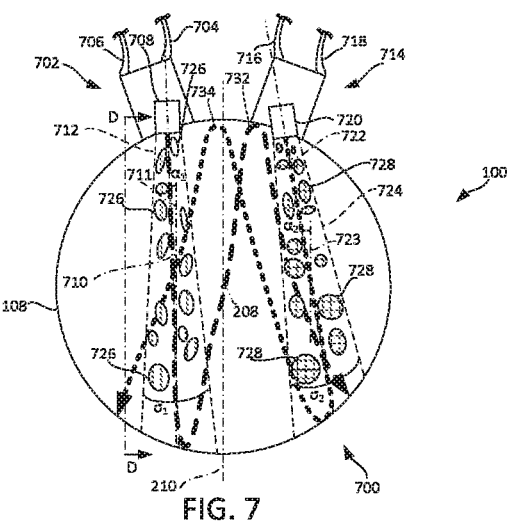
FIG. 7 is an cross-sectional view of a portion of the example aftertreatment system shown in FIG. 1, taken along plane A-A, having another example reductant delivery system.

FIG. 7 illustrates an example reductant delivery system 700 implemented in the aftertreatment system 100 and shown via a cross-section of the decomposition chamber 108 taken along plane A-A of FIG. 1. The reductant delivery system 700 is the reductant delivery system 102 in one embodiment. Accordingly, the foregoing description of the reductant delivery system 102 applies to the reductant delivery system 700.

The reductant delivery system 700 includes a first dosing module 702. The foregoing description of the first dosing module 110 applies to the first dosing module 702. The first dosing module 702 includes a first input 704 and a first output 706. The first input 704 is coupled to the reductant delivery conduit 126 and the first output 706 is coupled to the reductant return conduit 128. While not shown in FIG. 7, it is understood that the first dosing module 702 may also include an inlet for receiving air from the air pump 138. The first dosing module 702 also includes a first injector 708. The first injector 708 is configured to receive the reductant from the first input 704 and to dose the reductant into the decomposition chamber 108.

The first injector 708 is centered on (e.g., divided by, etc.) a first injector central axis 710. In some embodiments, the first injector central axis 710 symmetrically divides the first injector 708 and/or the first dosing module 702. The first injector central axis 710 does not intersect the decomposition chamber vertical axis 210 within the decomposition chamber 108. However, the first injector central axis 710 intersects a first reference axis 711 that is parallel to the decomposition chamber vertical axis 210. The first injector central axis 710 is separated from the first reference axis 711 by a first injector axis angle $\alpha_1$. It is understood that, due to the parallel nature of the first reference axis 711 and the decomposition chamber vertical axis 210, the first injector central axis 710 is also separated from the decomposition chamber vertical axis 210 by the first injector axis angle $\alpha_1$ (e.g., at an intersection of the first injector central axis 710 and the decomposition chamber vertical axis 210 outside of the decomposition chamber 108). The first injector 708 is configured to spray reductant in a first spray cone 712 having a first injector spray angle $\sigma_1$. The first spray cone 712 is a region where reductant dosed by the first injector 708 would be concentrated absent the effects from flow of the exhaust gas and of gravity on the reductant as it is dosed from the first injector 708.

The reductant delivery system 700 includes a second dosing module 714. The foregoing description of the second dosing module 112 applies to the second dosing module 714. The second dosing module 714 includes a second input 716 and a second output 718. The second input 716 is coupled to the reductant delivery conduit 126, and the second output 718 is coupled to the reductant return conduit 128. While not shown in FIG. 7, it is understood that the second dosing module 714 may also include an inlet for receiving air from the air pump 138. The second dosing module 714 also includes a second injector 720. The second injector 720 is configured to receive the reductant from the second input 716 and to dose the reductant into the decomposition chamber 108.

The second injector 720 is centered on a second injector central axis 722. In some embodiments, the second injector central axis 722 symmetrically divides the second injector 720 and/or the second dosing module 714. The second injector central axis 722 does not intersect the decomposition chamber vertical axis 210 within the decomposition chamber 108. However, the second injector central axis 722 intersects a second reference axis 723 that is parallel to the decomposition chamber vertical axis 210. The second injector central axis 722 is separated from the second reference axis 723 by a second injector axis angle $\alpha_2$. It is understood that, due to the parallel nature of the second reference axis 723 and the decomposition chamber vertical axis 210, the second injector central axis 722 is also separated from the decomposition chamber vertical axis 210 by the second injector axis angle $\alpha_2$ (e.g., at an intersection of the second injector central axis 722 and the decomposition chamber vertical axis 210 outside of the decomposition chamber 108). The second injector 720 is configured to spray reductant in a second spray cone 724 having a second injector spray angle $\sigma_2$. The second spray cone 724 is a region where reductant dosed by the second injector 720 would be concentrated absent the effects from flow of the exhaust gas and of gravity on the reductant as it is dosed from the second injector 720.

In FIG. 7, the first injector axis angle $\alpha_1$ is less than the second injector axis angle $\alpha_2$ and the first injector spray angle $\sigma_1$ is approximately equal to the second injector spray angle $\sigma_2$. In some embodiments, the first injector axis angle $\alpha_1$ is equal to 5° and the second injector axis angle $\alpha_2$ is equal to 8°. In some embodiments, the first injector spray angle $\sigma_1$ is equal to 30° and the second injector spray angle $\sigma_2$ is equal to 30°.

As shown in FIG. 7, large reductant droplets 726 are dosed from the first injector 708 along the first injector central axis 710 towards the decomposition chamber 108 and large reductant droplets 728 are dosed from the second injector 720 along the second injector central axis 722 towards the decomposition chamber 108. The large reductant droplets 726 and the large reductant droplets 728 do not contact each other (e.g., underneath the first injector 708 and the second injector 720, etc.). Instead, the large reductant droplets 726 and the large reductant droplets 728 independently break down into small reductant droplets 730 downstream of the first injector 708 and downstream of the second injector 720, as shown in FIG. 8.

FIG. 7 also illustrates a first trajectory 732 and a second trajectory 734. The first trajectory 732 is different from the second trajectory 734. The first trajectory 732 illustrates the flow of the reductant dosed into the decomposition chamber 108 from the first injector 708. Similarly, the second trajectory 734 illustrates the flow of the reductant dosed into the decomposition chamber 108 from the second injector 720. The first trajectory 732 does not intersect the second trajectory 734. Instead of breaking reductant down via collision, the first trajectory 732 and the second trajectory 734 independently break down reductant via swirling within the exhaust gas.

The first dosing module 702 and the second dosing module 714 are each coupled to the decomposition chamber 108 such that the first trajectory 732 and the second trajectory 734 each swirl (e.g., spin, rotate, etc.) within the decomposition chamber 108 in opposing directions. This swirl facilitates additional decomposition of the reductant in the exhaust gas, thereby increasing the UI of the reductant within the exhaust gas.

Figure 8:
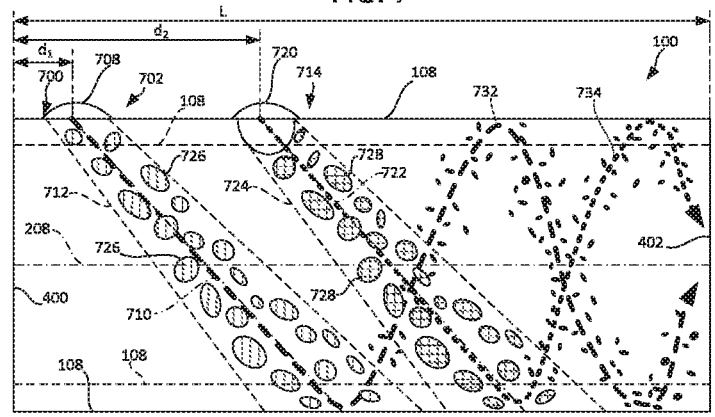
FIG. 8 is a side cross-sectional view of the portion of the example aftertreatment system shown in FIG. 7, taken along plane D-D.

FIG. 8 illustrates the reductant delivery system 700 via a cross-section of the decomposition chamber 108 taken along plane D-D of FIG. 7. In FIG. 8, the flow of the exhaust gas is from the decomposition chamber inlet 400 to the decomposition chamber outlet 402. Aside from being coupled to the decomposition chamber 108 at the first injector axis angle $\alpha_1$, the first dosing module 702 is also coupled to the decomposition chamber 108 such that the first injector central axis 710 is disposed a first injector distance $d_1$ from the decomposition chamber inlet 400. The first injector distance $d_1$ is equal to a fraction of the decomposition chamber length L. In some embodiments, the first injector distance $d_1$ is equal to approximately $\frac{1}{20}$ of the decomposition chamber length L. Aside from being coupled to the decomposition chamber 108 at the second injector axis angle $\alpha_2$, the second dosing module 714 is also coupled to the decomposition chamber 108 such that the second injector central axis 722 is disposed a second injector distance $d_2$ from the decomposition chamber inlet 400. The second injector distance $d_2$ is equal to a fraction of the decomposition chamber length L. In some embodiments, the second injector distance $d_2$ is equal to approximately $\frac{2}{5}$ of the decomposition chamber length L.

The first trajectory 732 and the second trajectory 734 are also shown in FIG. 8. Due to the difference between the first injector distance $d_1$ and the second injector distance $d_2$, the swirl produced by the first trajectory 732 is offset from the swirl produced by the second trajectory 734, thereby facilitating increased mixing between the reductant and the exhaust gas. In FIG. 8, the first injector distance $d_1$ and the second injector distance $d_2$ substantially prevent interference (e.g., contact, etc.) between the reductant and/or the exhaust gas propelled along the first trajectory

VI. Example Control Strategies of an Example Reductant Delivery System

Figure 9:
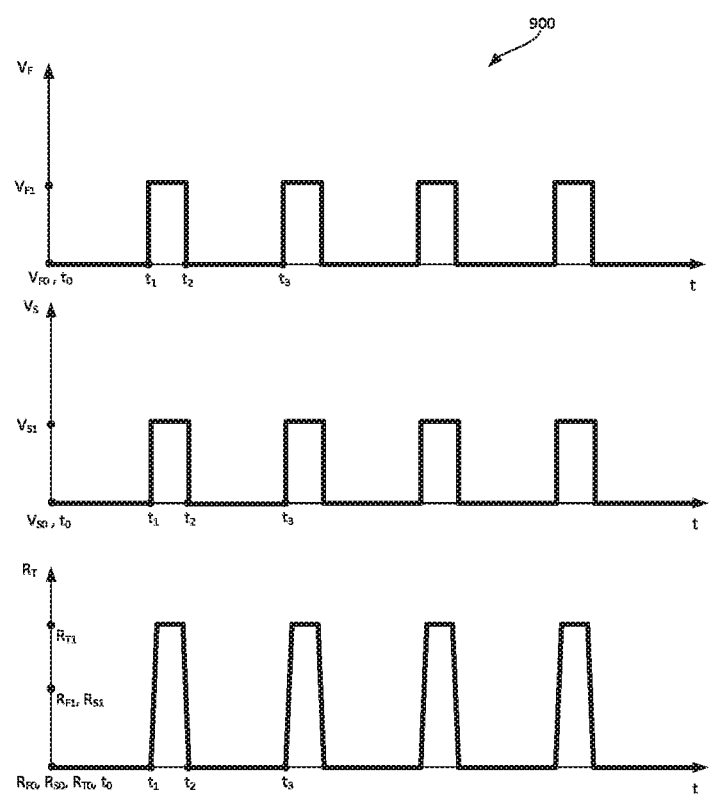
FIG. 9 is a view of several graphs illustrating an example control strategy for a first dosing module and a second dosing module of a reductant delivery system.

FIG. 9 illustrates an example control strategy 900 implemented in the aftertreatment system 100. The control strategy 900 is a manner of controlling the first dosing module 110 and the second dosing module 112 using the controller 133 to dose reductant in a target manner into the exhaust gas within the decomposition chamber 108. Specifically, the control strategy 900 controls a voltage $V_F$ supplied to the first dosing module 110 to cause a volumetric flow rate of reductant $R_F$ to be dosed from the first dosing module 110 and a voltage $V_S$ supplied to the second dosing module 112 to cause a volumetric flow rate of reductant $R_S$ to be dosed from the second dosing module 112.

By providing the voltage $V_F$ to the first dosing module 110, the first dosing module 110 is activated (e.g., enabled, operational, etc.) and remains activated so long as the first dosing module 110 is provided the voltage $V_F$. The first dosing module 110 is deactivated (e.g., disabled, not operational, etc.) when the first dosing module 110 does not receive the voltage $V_F$. Similarly, by providing the voltage $V_S$ to the second dosing module 112, the second dosing module 112 is activated (e.g., enabled, operational, etc.) and remains activated so long as the second dosing module 112 is provided the voltage $V_S$. The second dosing module 112 is deactivated (e.g., disabled, not operational, etc.) when the second dosing module 112 does not receive the voltage $V_S$.

The control strategy 900 is related to a total volumetric flow rate of reductant $R_T$ provided to the aftertreatment system 100. In various embodiments, the total volumetric flow rate of reductant $R_T$ is approximately equal to a target volumetric flow rate of reductant associated with desirable performance of the aftertreatment system 100. The total volumetric flow rate of reductant $R_T$ is equal to the sum of the volumetric flow rate of reductant $R_F$ and the volumetric flow rate of reductant $R_S$.

In some embodiments, the volumetric flow rate of reductant $R_F$ and the volumetric flow rate of reductant $R_S$ are selected by the controller 133 based on a diameter of the decomposition chamber 108. For example, in some embodiments the volumetric flow rate of reductant $R_F$ and the volumetric flow rate of reductant $R_S$ are linearly related such that for decomposition chambers 108 having larger diameters, the controller 133 selects a greater volumetric flow rate of reductant $R_F$ and a greater volumetric flow rate of reductant $R_S$.

The control strategy 900 includes, at the time $t_0$, providing, by the controller 133, a voltage $V_{F0}$ to the first dosing module 110. In various embodiments, $V_{F0}$ is 0 volts, such that the first dosing module 110 is deactivated. $t_0$ may correspond to a static (e.g., off, etc.) state of an internal combustion engine having the aftertreatment system 100. The control strategy 900 also includes, at the time $t_1$, ceasing to provide, by the controller 133, the voltage $V_{F0}$ to the first dosing module 110 and instead providing, by the controller 133, a voltage $V_{F1}$ to the first dosing module 110. When the voltage $V_{F1}$ is provided to the first dosing module 110, the first dosing module 110 may be activated (e.g., if the voltage $V_{F0}$ is 0 volts, if the first dosing module 110 was deactivated prior to the time $t_1$, etc.). In some embodiments, the voltage $V_{F1}$ is 6 Volts, 10 Volts, or 12 Volts. The control strategy 900 also includes, at the time $t_2$, ceasing to provide, by the controller 133, the voltage $V_{F1}$ to the first dosing module 110 and instead providing, by the controller 133, the voltage $V_{F0}$ to the first dosing module 110. When the voltage $V_{F0}$ is provided to the first dosing module 110, the first dosing module 110 may be deactivated (e.g., if the voltage $V_{F0}$ is 0 volts, etc.). In this way, the control strategy 900 forms a voltage step from the time $t_1$ to the time $t_2$ and from the voltage $V_{F0}$ to the voltage $V_{F1}$. The control strategy 900 includes forming another voltage step at the time $t_3$. The second the voltage step may be identical to the first the voltage step. The control strategy 900 may include a target number of the voltage steps such that the control strategy 900 is tailored for a target application. Similarly, the time $t_0$, the time $t_1$, the time $t_2$, the time $t_3$, the voltage $V_{F0}$, and the voltage $V_{F1}$ may all be selected such that the control strategy 900 is tailored for a target application.

The control strategy 900 also includes, at the time $t_0$, providing, by the controller 133, a voltage $V_{S0}$ to the second dosing module 112. In various embodiments, the voltage $V_{S0}$ is equal to the voltage $V_{F0}$. In various embodiments, the voltage $V_{S0}$ is equal to 0 volts such that the second dosing module 112 is deactivated. The control strategy 900 also includes, at the time $t_1$, ceasing to provide, by the controller 133, the voltage $V_{S0}$ to the second dosing module 112 and instead providing, by the controller 133, a voltage $V_{S1}$ to the second dosing module 112. When the voltage $V_{S1}$ is provided to the second dosing module 112, the second dosing module 112 may be activated (e.g., if the voltage $V_{S0}$ is 0 volts, if the second dosing module 112 was deactivated prior to the time $t_1$, etc.). In various embodiments, $V_{S1}$ is equal to $V_{F1}$. The control strategy 900 also includes, at the time $t_2$, ceasing to provide, by the controller 133, the voltage $V_{S1}$ to the second dosing module 112 and instead providing, by the controller 133, the voltage $V_{S0}$ to the second dosing module 112. When the voltage $V_{S0}$ is provided to the second dosing module 112, the second dosing module 112 may be deactivated (e.g., if the voltage $V_{S0}$ is 0 volts, etc.). In this way, the control strategy 900 forms a voltage step from the time $t_1$ to the time $t_2$ and from the voltage $V_{S0}$ to the voltage $V_{S1}$. The control strategy 900 includes forming another voltage step at the time $t_3$. The second the voltage step may be identical to the first the voltage step. The control strategy 900 may include a target number of the voltage steps such that the control strategy 900 is tailored for a target application. Similarly, the time $t_0$, the time $t_1$, the time $t_2$, the time $t_3$, the voltage $V_{S0}$, and the voltage $V_{S1}$ may all be selected such that the control strategy 900 is tailored for a target application.

Due to the voltages being provided by the controller 133 to the first dosing module 110 and the second dosing module 112, and therefore the various activations and deactivations of the first dosing module 110 and the second dosing module 112, the total volumetric flow rate $R_T$ of reductant provided to the aftertreatment system 100 varies from the time $t_0$ through the time $t_3$ and beyond (e.g., with each voltage step, etc.). Specifically, at the time $t_0$, a total volumetric flow rate $R_{T0}$ is provided to the aftertreatment system 100. The total volumetric flow rate $R_{T0}$ is equal to the sum of a volumetric flow rate $R_{F0}$ of reductant provided to the aftertreatment system 100 by the first dosing module 110 at the time $t_0$ and a volumetric flow rate $R_{S0}$ of reductant provided to the aftertreatment system 100 by the second dosing module 112 at the time $t_0$. In various embodiments, the total volumetric flow rate $R_{T0}$ is 0 (i.e., no reductant is being provided to the aftertreatment system 100 by either the first dosing module 110 or the second dosing module 112, etc.). At the time $t_1$, a total volumetric flow rate $R_{T1}$ is provided to the aftertreatment system 100. The total volumetric flow rate $R_{T1}$ is equal to the sum of a volumetric flow rate $R_{F1}$ of reductant provided to the aftertreatment system 100 by the first dosing module 110 at the time $t_1$ and a volumetric flow rate $R_{S1}$ of reductant provided to the aftertreatment system 100 by the second dosing module 112 at the time $t_1$. In embodiments where the voltage $V_{F1}$ is equal to the voltage $V_{S1}$, the volumetric flow rate $R_{F1}$ may be equal to the volumetric flow rate $R_{S1}$. At the time $t_2$, the total volumetric flow rate $R_{T0}$ is provided until the time $t_3$, thereby forming a volumetric flow rate step corresponding to the voltage steps in both the voltage $V_F$ and the voltage $V_S$.

Figure 10:
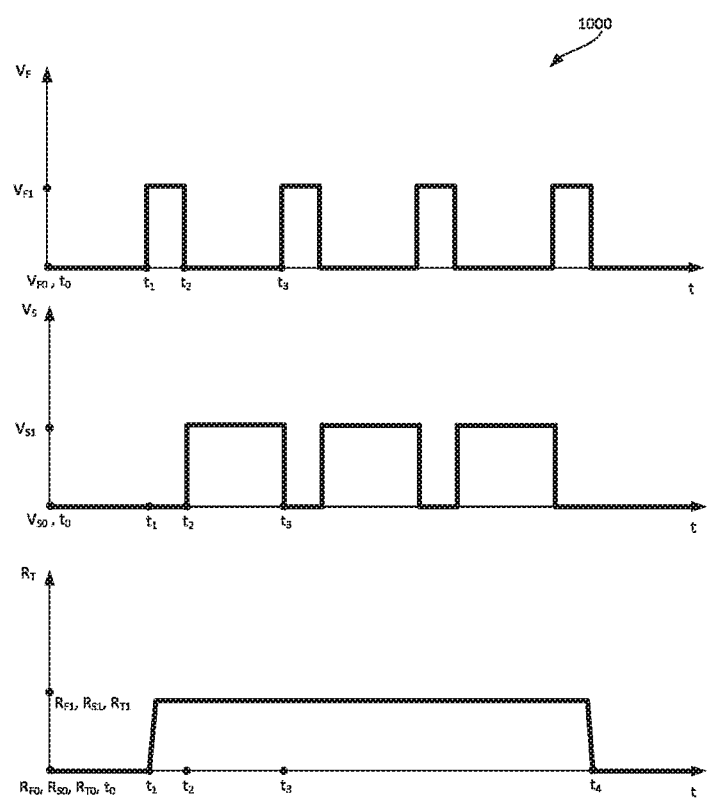
FIG. 10 is a view of several graphs illustrating another example control strategy for a first dosing module and a second dosing module of a reductant delivery system.

FIG. 10 illustrates an example control strategy 1000 implemented in the aftertreatment system 100. The control strategy 1000 is similar to the control strategy 900 previous described, except that the voltage is provided differently to the second dosing module 112 such that the second dosing module 112 is activated and deactivated differently than the first dosing module 110. According to the control strategy 1000, the voltage provided by the controller 133 to the second dosing module 112 at the time $t_0$ is the voltage $V_{S0}$ and remains the voltage $V_{S0}$ until the time $t_2$. For example, the second dosing module 112 may be deactivated from the time $t_0$ until the time $t_2$ (e.g., if the voltage $V_{S0}$ is 0 volts, etc.). At the time $t_2$, the control strategy 1000 includes ceasing to provide, by the controller 133, the voltage $V_{S0}$ to the second dosing module 112 and instead providing, by the controller 133, the voltage $V_{S1}$ to the second dosing module 112 while simultaneously ceasing to provide, by the controller 133, the voltage $V_{F1}$ to the first dosing module 110 and instead providing, by the controller 133, the voltage $V_{F0}$ to the first dosing module 110. For example, at the time $t_2$, the first dosing module 110 may be deactivated (e.g., if the voltage $V_{F0}$ is 0 volts, etc.) and the second dosing module 112 may be simultaneously activated (e.g., if the voltage $V_{S0}$ is 0 volts, etc.). The control strategy 1000 further includes, at the time $t_3$, ceasing to provide, by the controller 133, the voltage $V_{S1}$ to the second dosing module 112 and instead providing, by the controller 133, the voltage $V_{S0}$ to the second dosing module 112 while simultaneously ceasing to provide, by the controller 133, the voltage $V_{F0}$ to the first dosing module 110 and instead providing, by the controller 133, the voltage $V_{F1}$ to the first dosing module 110. For example, at the time $t_3$, the first dosing module 110 may be activated (e.g., if the voltage $V_{F0}$ is 0 volts, etc.) and the second dosing module 112 may be simultaneously deactivated (e.g., if the voltage $V_{S0}$ is 0 volts, etc.).

The control strategy 1000 forms alternating (e.g., staggered, etc.) voltage steps. For example, while one of the first dosing module 110 and the second dosing module 112 is being provided a voltage from the controller 133 (e.g., is activated, etc.), the other of the first dosing module 110 and the second dosing module 112 is not being provided a voltage from the controller 133 (e.g., is deactivated, etc.).

Due to the voltages being provided by the controller 133 to the first dosing module 110 and the second dosing module 112 in alternating fashion (e.g., the first dosing module 110 is activated and the second dosing module 112 is deactivated, the first dosing module 110 is deactivated and the second dosing module 112 is activated, etc.), the total volumetric flow rate of reductant $R_T$ remains substantially constant between the time $t_3$ and the time $t_4$, the time at which the last the voltage step being provided to either the first dosing module 110 or the second dosing module 112 occurs. Specifically, the total volumetric flow rate of reductant $R_{T1}$ is equal to the volumetric flow rate $R_{F1}$ or the volumetric flow rate $R_{S1}$, depending upon the time. Rather than having discrete volumetric flow rate steps, as occurs when utilizing the control strategy 900, the control strategy 1000 has a single volumetric flow rate step, thereby causing reductant to be constantly provided to the aftertreatment system 100 between the time $t_1$ and the time $t_4$.

Figure 11:
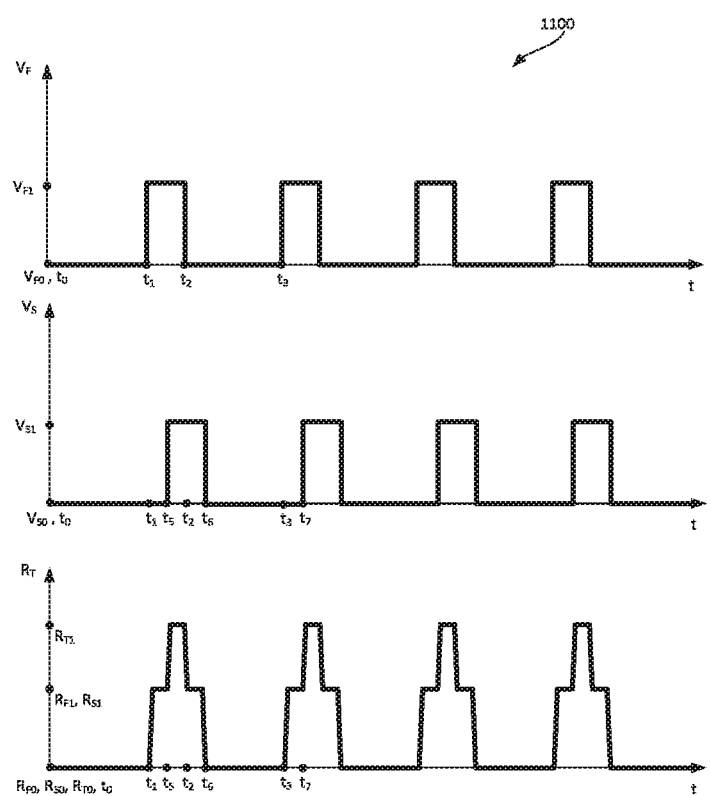
FIG. 11 is a view of several graphs illustrating another example control strategy for a first dosing module and a second dosing module of a reductant delivery system.

FIG. 11 illustrates an example control strategy 1100 implemented in the aftertreatment system 100. The control strategy 1100 is similar to the control strategy 900 previous described, except that the voltage is provided differently to the second dosing module 112 such that the second dosing module 112 is activated and deactivated differently than the first dosing module 110. According to the control strategy 1100, the voltage provided by the controller 133 to the second dosing module 112 at the time $t_0$ is the voltage $V_{S0}$ and remains the voltage $V_{S0}$ until the time $t_5$, which occurs after the time $t_1$ and before the time $t_2$. For example, the second dosing module 112 may be deactivated from the time $t_0$ until the time $t_5$ (e.g., if the voltage $V_{S0}$ is 0 volts, etc.). At the time $t_5$, the control strategy 1100 includes ceasing to provide, by the controller 133, the voltage $V_{S0}$ to the second dosing module 112 and instead providing, by the controller 133, the voltage $V_{S1}$ to the second dosing module 112. For example, the second dosing module 112 may be activated at the time $t_5$ (e.g., if the voltage $V_{S0}$ is 0 volts, etc.). The control strategy 1100 further includes, at the time $t_6$, ceasing to provide, by the controller 133, the voltage $V_{S1}$ to the second dosing module 112 and instead providing, by the controller 133, the voltage $V_{S0}$ to the second dosing module 112. For example, the second dosing module 112 may be deactivated at the time $t_6$ (e.g., if the voltage $V_{S0}$ is 0 volts, etc.). The control strategy 1100 further includes, at the time $t_7$, ceasing to provide, by the controller 133, the voltage $V_{S0}$ to the second dosing module 112 and instead providing, by the controller 133, the voltage $V_{S1}$ to the second dosing module 112. For example, the second dosing module 112 may be deactivated from the time $t_6$ until the time $t_7$ (e.g., if the voltage $V_{S0}$ is 0 volts, etc.). According to the control strategy 1100, the voltage is provided by the controller 133 to only the first dosing module 110 between the time $t_1$ and the time $t_5$ (e.g., only the first dosing module 110 is activated between the time $t_1$ and the time $t_5$, etc.), to both the first dosing module 110 and the second dosing module 112 between the time $t_5$ and the time $t_2$ (e.g., both the first dosing module 110 and the second dosing module are activated between the time $t_5$ and the time $t_2$, etc.), and to only the second dosing module 112 between the time $t_2$ and the time $t_6$ (e.g., only the second dosing module 112 is activated between the time $t_2$ and the time $t_6$, etc.).

The control strategy 1100 forms alternating (e.g., staggered, etc.) voltage steps, each voltage step containing a sub-step that corresponds with a greater the voltage than each of the voltage steps. For example, while one of the first dosing module 110 and the second dosing module 112 is being provided a voltage from the controller 133 (e.g., is activated, etc.), the other of the first dosing module 110 and the second dosing module 112 may not being provided a voltage from the controller 133 (e.g., is deactivated, etc.), thereby forming a voltage step. However, while both the first dosing module 110 and the second dosing module 112 are being provided a voltage from the controller 133 (e.g., are activated, etc.), a voltage sub-step may be formed.

Like the voltage steps and sub-steps, the total volumetric flow rate of reductant $R_T$ also includes steps and sub-steps. From the time $t_1$ to the time $t_5$, the volumetric flow rate $R_{F1}$ is provided because the voltage $V_{F1}$ is provided to the first dosing module 110 and the voltage $V_{S0}$ is provided to the second dosing module 112. From the time $t_5$ to the time $t_2$, the volumetric flow rate $R_{T1}$ is provided because the voltage $V_{F1}$ is provided to the first dosing module 110 and the voltage $V_{S1}$ is provided to the second dosing module 112. From the time $t_2$ to the time $t_6$, the volumetric flow rate $R_{S1}$ is provided because the voltage $V_{F0}$ is provided to the first dosing module 110 and the voltage $V_{S1}$ is provided to the second dosing module 112. From the time $t_6$ to the time $t_3$, the volumetric flow rate $R_{T0}$ is provided because the voltage $V_{F0}$ is provided to the first dosing module 110 and the voltage $V_{S0}$ is provided to the second dosing module 112.

Figure 12:
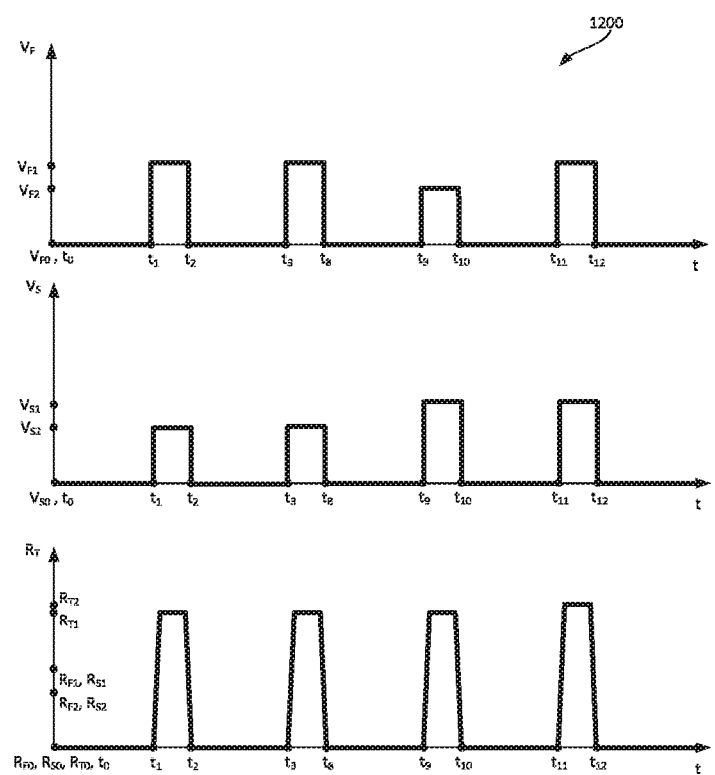
FIG. 12 is a view of several graphs illustrating another example control strategy for a first dosing module and a second dosing module of a reductant delivery system.

FIG. 12 illustrates an example control strategy 1200 implemented in the aftertreatment system 100. The control strategy 1200 is similar to the control strategy 900 previous described, except that the voltage is provided differently to the first dosing module 110 and the second dosing module 112 such that the first dosing module 110 and the second dosing module 112 are activated and deactivated differently.

With regard to the first dosing module 110 and according to the control strategy 1200, the voltage provided by the controller 133 to the first dosing module 110 at the time $t_0$ is the voltage $V_{F0}$ and remains the voltage $V_{F0}$ until the time $t_1$. For example, the first dosing module 110 may be deactivated from the time $t_0$ until the time $t_1$ (e.g., if the voltage $V_{F0}$ is 0 volts, etc.). At the time $t_1$, the control strategy 1200 includes ceasing to provide, by the controller 133, the voltage $V_{F0}$ to the first dosing module 110 and instead providing, by the controller 133, the voltage $V_{F1}$ to the first dosing module 110 until the time $t_2$. For example, the first dosing module 110 may be activated from the time $t_1$ until the time $t_2$ (e.g., if the voltage $V_{F0}$ is 0 volts, etc.). At the time $t_2$, the control strategy 1200 includes ceasing to provide, by the controller 133, the voltage $V_{F1}$ to the first dosing module 110 and instead providing, by the controller 133, the voltage $V_{F0}$ to the first dosing module 110 until the time $t_3$. For example, the first dosing module 110 may be deactivated from the time $t_2$ until the time $t_3$ (e.g., if the voltage $V_{F0}$ is 0 volts, etc.). At the time $t_3$, the control strategy 1200 includes ceasing to provide, by the controller 133, the voltage $V_{F0}$ to the first dosing module 110 and instead providing, by the controller 133, the voltage $V_{F1}$ to the first dosing module 110 until the time $t_8$. For example, the first dosing module 110 may be activated from the time $t_3$ until the time $t_8$ (e.g., if the voltage $V_{F0}$ is 0 volts, etc.). At the time $t_8$, the control strategy 1200 includes ceasing to provide, by the controller 133, the voltage $V_{F1}$ to the first dosing module 110 and instead providing, by the controller 133, the voltage $V_{F0}$ to the first dosing module 110 until the time $t_9$. For example, the first dosing module 110 may be deactivated from the time $t_8$ until the time $t_9$ (e.g., if the voltage $V_{F0}$ is 0 volts, etc.). At the time $t_9$, the control strategy 1200 includes ceasing to provide, by the controller 133, the voltage $V_{F0}$ to the first dosing module 110 and instead providing, by the controller 133, the voltage $V_{F2}$ to the first dosing module 110 until the time $t_{10}$. For example, the first dosing module 110 may be activated from the time $t_9$ until the time $t_{10}$ (e.g., if the voltage $V_{F0}$ is 0 volts, etc.). The voltage $V_{F2}$ is different from (e.g., less than, greater than, etc.) the voltage $V_{F1}$. At the time $t_{10}$, the control strategy 1200 includes ceasing to provide, by the controller 133, the voltage $V_{F2}$ to the first dosing module 110 and instead providing, by the controller 133, the voltage $V_{F0}$ to the first dosing module 110 until the time $t_{11}$. For example, the first dosing module 110 may be deactivated from the time $t_{10}$ until the time $t_{11}$ (e.g., if the voltage $V_{F0}$ is 0 volts, etc.).

With regard to the second dosing module 112 and according to the control strategy 1200, the voltage provided by the controller 133 to the second dosing module 112 at the time $t_0$ is the voltage $V_{S0}$ and remains the voltage $V_{S0}$ until the time $t_1$. For example, the second dosing module 112 may be deactivated from the time $t_0$ until the time $t_1$ (e.g., if the voltage $V_{S0}$ is 0 volts, etc.). At the time $t_1$, the control strategy 1200 includes ceasing to provide, by the controller 133, the voltage $V_{S0}$ to the second dosing module 112 and instead providing, by the controller 133, the voltage $V_{S2}$ to the second dosing module 112 until the time $t_2$. For example, the second dosing module 112 may be activated from the time $t_1$ until the time $t_2$ (e.g., if the voltage $V_{S0}$ is 0 volts, etc.). At the time $t_2$, the control strategy 1200 includes ceasing to provide, by the controller 133, the voltage $V_{S2}$ to the second dosing module 112 and instead providing, by the controller 133, the voltage $V_{S0}$ to the second dosing module 112 until the time $t_3$. For example, the second dosing module 112 may be deactivated from the time $t_2$ until the time $t_3$ (e.g., if the voltage $V_{S0}$ is 0 volts, etc.). At the time $t_3$, the control strategy 1200 includes ceasing to provide, by the controller 133, the voltage $V_{S0}$ to the second dosing module 112 and instead providing, by the controller 133, the voltage $V_{S2}$ to the second dosing module 112 until the time $t_8$. For example, the second dosing module 112 may be activated from the time $t_3$ until the time $t_8$ (e.g., if the voltage $V_{S0}$ is 0 volts, etc.). At the time $t_8$, the control strategy 1200 includes ceasing to provide, by the controller 133, the voltage $V_{S2}$ to the second dosing module 112 and instead providing, by the controller 133, the voltage $V_{S0}$ to the second dosing module 112 until the time $t_9$. For example, the second dosing module 112 may be deactivated from the time $t_8$ until the time $t_9$ (e.g., if the voltage $V_{S0}$ is 0 volts, etc.). At the time $t_9$, the control strategy 1200 includes ceasing to provide, by the controller 133, the voltage $V_{S0}$ to the second dosing module 112 and instead providing, by the controller 133, the voltage $V_{S1}$ to the second dosing module 112 until the time $t_{10}$. For example, the second dosing module 112 may be activated from the time $t_9$ until the time $t_{10}$ (e.g., if the voltage $V_{S0}$ is 0 volts, etc.). The voltage $V_{S2}$ is different from (e.g., less than, greater than, etc.) the voltage $V_{S1}$. At the time $t_{10}$, the control strategy 1200 includes ceasing to provide, by the controller 133, the voltage $V_{S1}$ to the second dosing module 112 and instead providing, by the controller 133, the voltage $V_{S0}$ to the second dosing module 112 until the time $t_{11}$. For example, the second dosing module 112 may be deactivated from the time $t_{10}$ until the time $t_{11}$ (e.g., if the voltage $V_{S0}$ is 0 volts, etc.).

The control strategy 1200 forms alternating (e.g., staggered, etc.) voltage steps, some voltage steps being greater than other voltage steps. For example, while one of the first dosing module 110 and the second dosing module 112 is being provided a voltage from the controller 133, the other of the first dosing module 110 and the second dosing module 112 is also being provided a voltage from the controller 133, thereby forming a voltage step.

The sum of the voltage provided to the first dosing module 110 between the time $t_{11}$ and the time $t_{12}$ and the voltage provided to the second dosing module 112 between the time $t_{11}$ and the time $t_{12}$ is different from (e.g., greater than, less than, etc.) the sum of the voltage provided to the first dosing module 110 between the time $t_9$ and the time $t_{10}$ and the voltage provided to the second dosing module 112 between the time $t_9$ and the time $t_{10}$. In this way, the control strategy 1200 can utilize the first dosing module 110 and the second dosing module 112 to execute quantity sharing and scheduling between the first dosing module 110 and the second dosing module 112 (e.g., the first dosing module 110 provides more reductant for most voltage steps while the second dosing module 112 provides less reductant for most voltage steps, more reductant is provided in some voltage steps than in other voltage steps, etc.).

Like the voltage steps, the total volumetric flow rate of reductant $R_T$ also includes steps. From the time $t_1$ to the time $t_2$, the total volumetric flow rate $R_{T1}$ provided by the first dosing module 110 and the second dosing module 112 is less than the total volumetric flow rate $R_{T2}$ provided by the first dosing module 110 and the second dosing module 112 from the time $t_{11}$ to the time $t_{12}$. The volumetric flow rate $R_{F2}$ of reductant provided by the first dosing module 110 when the voltage provided to the first dosing module 110 is the voltage $V_{F2}$ is different from (e.g., less than, greater than, etc.) the volumetric flow rate $R_{F1}$ of reductant provided by the first dosing module 110 when the voltage provided to the first dosing module 110 is the voltage $V_{F1}$. Similarly, the volumetric flow rate $R_{S2}$ of reductant provided by the second dosing module 112 when the voltage provided to the second dosing module 112 is the voltage $V_{S2}$ is different from (e.g., less than, greater than, etc.) the volumetric flow rate $R_{S1}$ of reductant provided by the second dosing module 112 when the voltage provided to the second dosing module 112 is the voltage $V_{S1}$.

VII. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the systems shown in the various example implementations are illustrative only and are not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. An aftertreatment system comprising:
a decomposition chamber;
a reductant pump;
a first dosing module coupled to the decomposition chamber and configured to receive reductant from the reductant pump;
a second dosing module coupled to the decomposition chamber and configured to receive reductant from the reductant pump independent of the first dosing module; and
a controller communicatively coupled to the first dosing module and the second dosing module, the controller configured to independently control a first volumetric flow rate of reductant provided from the first dosing module into the decomposition chamber and a second volumetric flow rate of reductant provided from the second dosing module into the decomposition chamber;
wherein the first volumetric flow rate of reductant and the second volumetric flow rate of reductant are selected by the controller based on a diameter of the decomposition chamber.

2. The aftertreatment system of claim 1, wherein:
the first dosing module is coupled to the decomposition chamber such that reductant provided from the first dosing module is provided along a first trajectory within the decomposition chamber and dispersed into exhaust gases within the decomposition chamber along the first trajectory;
the second dosing module is coupled to the decomposition chamber such that reductant provided from the second dosing module is provided along a second trajectory within the decomposition chamber and dispersed into exhaust gases within the decomposition chamber along the second trajectory; and
the second trajectory is different from the first trajectory.

3. The aftertreatment system of claim 2, wherein:
the first trajectory comprises a helical swirl in a first direction; and
the second trajectory comprises a helical swirl in a second direction opposite to the first direction.

4. The aftertreatment system of claim 2, wherein the first dosing module and the second dosing module are coupled to the decomposition chamber such that the first trajectory and the second trajectory intersect.

5. The aftertreatment system of claim 2, wherein the first dosing module and the second dosing module are coupled to the decomposition chamber such that the first trajectory and the second trajectory do not intersect.

6. The aftertreatment system of claim 1, wherein:
the decomposition chamber is centered on a decomposition chamber central axis and bisected by a decomposition chamber vertical axis orthogonal to the decomposition chamber central axis; and
the first dosing module and the second dosing module are coupled to the decomposition chamber on opposite sides of the decomposition chamber vertical axis.

7. The aftertreatment system of claim 6, wherein:
the first dosing module comprises a first injector configured to provide reductant into the decomposition chamber, the first injector centered on a first injector central axis that is angularly separated from the decomposition chamber vertical axis by a first injector axis angle in a first direction;
the second dosing module comprises a second injector configured to provide reductant into the decomposition chamber, the second injector centered on a second injector central axis that is angularly separated from the decomposition chamber vertical axis by a second injector axis angle in the first direction; and
the second injector axis angle is different from the first injector axis angle.

8. The aftertreatment system of claim 7, wherein the second injector axis angle is approximately equal to 360 degrees less the first injector axis angle.

9. The aftertreatment system of claim 7, wherein the first injector axis angle is between 0 degrees and 90 degrees, inclusive, and the second injector axis angle is between 270 degrees and 360 degrees, inclusive.

10. The aftertreatment system of claim 7, wherein the first injector axis angle is between 0 degrees and 90 degrees, inclusive, and the second injector axis angle is between 0 degrees and 90 degrees, inclusive.

11. The aftertreatment system of claim 6, wherein:
the decomposition chamber comprises a decomposition chamber inlet;
the first dosing module is separated from the decomposition chamber inlet by a first distance along the decomposition chamber central axis;
the second dosing module is separated from the decomposition chamber inlet by a second distance along the decomposition chamber central axis; and
the first distance is the approximately the same as the second distance.

12. The aftertreatment system of claim 6, wherein:
the decomposition chamber comprises a decomposition chamber inlet;
the first dosing module is separated from the decomposition chamber inlet by a first distance along the decomposition chamber central axis;
the second dosing module is separated from the decomposition chamber inlet by a second distance along the decomposition chamber central axis; and
the first distance is different from the second distance.

13. The aftertreatment system of claim 1, wherein the controller is further configured to:
activate the first dosing module at a first time;
deactivate the first dosing module at a second time;
deactivate the second dosing module at the first time; and
activate the second dosing module at the second time.

14. The aftertreatment system of claim 13, wherein:
the first dosing module is configured to provide the first volumetric flow rate when activated;
the second dosing module is configured to provide the second volumetric flow rate when activated; and
the first volumetric flow rate is equal to the second volumetric flow rate.

15. The aftertreatment system of claim 13, wherein:
the first dosing module is configured to provide the first volumetric flow rate when activated;
the second dosing module is configured to provide the second volumetric flow rate when activated; and
the first volumetric flow rate is different from the second volumetric flow rate.

16. The aftertreatment system of claim 1, wherein the controller is further configured to:
activate the first dosing module at a first time;
deactivate the first dosing module at a second time;
activate the second dosing module at the first time; and
deactivate the second dosing module at the second time.

17. The aftertreatment system of claim 16, wherein:
the first dosing module is configured to provide the first volumetric flow rate when activated;
the second dosing module is configured to provide the second volumetric flow rate when activated; and
the first volumetric flow rate is equal to the second volumetric flow rate.

18. The aftertreatment system of claim 16, wherein:
the first dosing module is configured to provide the first volumetric flow rate when activated;
the second dosing module is configured to provide the second volumetric flow rate when activated; and
the first volumetric flow rate is different from the second volumetric flow rate.

19. An aftertreatment system comprising:
a decomposition chamber comprising a decomposition chamber inlet, the decomposition chamber centered on a decomposition chamber central axis and bisected by a decomposition chamber vertical axis orthogonal to the decomposition chamber central axis;
a first dosing module coupled to the decomposition chamber and configured to receive reductant, the first dosing module separated from the decomposition chamber inlet by a first distance along the decomposition chamber central axis;
a second dosing module coupled to the decomposition chamber and configured to receive reductant, the second dosing module separated from the decomposition chamber inlet by a second distance along the decomposition chamber central axis, the second distance being different from the first distance; and
a controller communicatively coupled to the first dosing module and the second dosing module, the controller configured to selectively activate and deactivate the first dosing module and the second dosing module;
wherein the first dosing module is centered on a first axis that intersects the decomposition chamber vertical axis such that the first axis is separated from the decomposition chamber vertical axis by a first angle, the first dosing module configured to provide reductant into the decomposition chamber along a first trajectory when activated;
wherein the second dosing module is centered on a second axis that intersects the decomposition chamber vertical axis such that the second axis is separated from the decomposition chamber vertical axis by a second angle, the second angle different from the first angle, the second dosing module configured to provide reductant into the decomposition chamber along a second trajectory when activated;
wherein the first dosing module and the second dosing module are coupled to the decomposition chamber such that: (i) the first axis and the second axis intersect within the decomposition chamber or (ii) the first trajectory and the second trajectory form offset swirls that do not intersect within the decomposition chamber.

20. An aftertreatment system comprising:
a decomposition chamber;
a first dosing module coupled to the decomposition chamber and configured to receive reductant;
a second dosing module coupled to the decomposition chamber and configured to receive reductant; and
a controller communicatively coupled to the first dosing module and the second dosing module, the controller configured to selectively activate and deactivate the first dosing module and the second dosing module;
wherein the first dosing module is configured to provide reductant into the decomposition chamber and is coupled to the decomposition chamber such that reductant provided from the first dosing module is provided along a first trajectory within the decomposition chamber and dispersed into exhaust gases within the decomposition chamber along the first trajectory;
wherein the second dosing module is configured to provide reductant into the decomposition chamber and is coupled to the decomposition chamber such that reductant provided from the second dosing module is provided along a second trajectory within the decomposition chamber and dispersed into exhaust gases within the decomposition chamber along the second trajectory;

wherein the second trajectory is different from the first trajectory;

wherein the first trajectory comprises a helical swirl in a first direction; and wherein the second trajectory comprises a helical swirl in a second direction opposite to the first direction.

21. The aftertreatment system of claim 20, wherein the first dosing module and the second dosing module are coupled to the decomposition chamber such that the first trajectory and the second trajectory intersect.

22. The aftertreatment system of claim 21, wherein the first dosing module and the second dosing module are coupled to the decomposition chamber such that the first trajectory and the second trajectory do not intersect.

23. The aftertreatment system of claim 20, wherein:

the decomposition chamber is centered on a decomposition chamber central axis and bisected by a decomposition chamber vertical axis orthogonal to the decomposition chamber central axis; and the first dosing module and the second dosing module are coupled to the decomposition chamber on opposite sides of the decomposition chamber vertical axis.

24. The aftertreatment system of claim 23, wherein:

the first dosing module comprises a first injector configured to provide reductant into the decomposition chamber, the first injector centered on a first injector central axis that is angularly separated from the decomposition chamber vertical axis by a first injector axis angle in a third direction;

the second dosing module comprises a second injector configured to provide reductant into the decomposition chamber, the second injector centered on a second injector central axis that is angularly separated from the decomposition chamber vertical axis by a second injector axis angle in the third direction; and the second injector axis angle is different from the first injector axis angle.

25. The aftertreatment system of claim 24, wherein the second injector axis angle is approximately equal to 360 degrees less the first injector axis angle.

26. The aftertreatment system of claim 24, wherein the first injector axis angle is between 0 degrees and 90 degrees, inclusive, and the second injector axis angle is between 270 degrees and 360 degrees, inclusive.

27. The aftertreatment system of claim 24, wherein the first injector axis angle is between 0 degrees and 90 degrees, inclusive, and the second injector axis angle is between 0 degrees and 90 degrees, inclusive.

28. An aftertreatment system comprising:

a decomposition chamber;

a reductant pump;

a first dosing module coupled to the decomposition chamber and configured to receive reductant from the reductant pump;

a second dosing module coupled to the decomposition chamber and configured to receive reductant from the reductant pump independent of the first dosing module; and a controller communicatively coupled to the first dosing module and the second dosing module, the controller configured to independently control a first volumetric flow rate of reductant provided from the first dosing module into the decomposition chamber and a second volumetric flow rate of reductant provided from the second dosing module into the decomposition chamber;

wherein the first dosing module is coupled to the decomposition chamber such that reductant provided from the first dosing module is provided along a first trajectory within the decomposition chamber and dispersed into exhaust gases within the decomposition chamber along the first trajectory;

wherein the second dosing module is coupled to the decomposition chamber such that reductant provided from the second dosing module is provided along a second trajectory within the decomposition chamber and dispersed into exhaust gases within the decomposition chamber along the second trajectory;

wherein the second trajectory is different from the first trajectory;

wherein the first trajectory comprises a helical swirl in a first direction; and wherein the second trajectory comprises a helical swirl in a second direction opposite to the first direction.

29. An aftertreatment system comprising:

a decomposition chamber;

a reductant pump;

a first dosing module coupled to the decomposition chamber and configured to receive reductant from the reductant pump;

a second dosing module coupled to the decomposition chamber and configured to receive reductant from the reductant pump independent of the first dosing module; and a controller communicatively coupled to the first dosing module and the second dosing module, the controller configured to independently control a first volumetric flow rate of reductant provided from the first dosing module into the decomposition chamber and a second volumetric flow rate of reductant provided from the second dosing module into the decomposition chamber;

wherein the decomposition chamber is centered on a decomposition chamber central axis and bisected by a decomposition chamber vertical axis orthogonal to the decomposition chamber central axis;

wherein the first dosing module and the second dosing module are coupled to the decomposition chamber on opposite sides of the decomposition chamber vertical axis;

wherein the first dosing module comprises a first injector configured to provide reductant into the decomposition chamber, the first injector centered on a first injector central axis that is angularly separated from the decomposition chamber vertical axis by a first injector axis angle in a first direction;

wherein the second dosing module comprises a second injector configured to provide reductant into the decomposition chamber, the second injector centered on a second injector central axis that is angularly separated from the decomposition chamber vertical axis by a second injector axis angle in the first direction; and wherein the second injector axis angle is different from the first injector axis angle.

30. The aftertreatment system of claim 29, wherein the second injector axis angle is approximately equal to 360 degrees less the first injector axis angle.

31. The aftertreatment system of claim 29, wherein the first injector axis angle is between 0 degrees and 90 degrees, inclusive, and the second injector axis angle is between 270 degrees and 360 degrees, inclusive.

32. The aftertreatment system of claim 29, wherein the first injector axis angle is between 0 degrees and 90 degrees, inclusive, and the second injector axis angle is between 0 degrees and 90 degrees, inclusive.

33. An aftertreatment system comprising:
a decomposition chamber;
a first dosing module coupled to the decomposition chamber and configured to receive reductant;
a second dosing module coupled to the decomposition chamber and configured to receive reductant; and
a controller communicatively coupled to the first dosing module and the second dosing module, the controller configured to selectively activate and deactivate the first dosing module and the second dosing module;
wherein the first dosing module is configured to provide reductant into the decomposition chamber and is coupled to the decomposition chamber such that reductant provided from the first dosing module is provided along a first trajectory within the decomposition chamber and dispersed into exhaust gases within the decomposition chamber along the first trajectory;
wherein the second dosing module is configured to provide reductant into the decomposition chamber and is coupled to the decomposition chamber such that reductant provided from the second dosing module is provided along a second trajectory within the decomposition chamber and dispersed into exhaust gases within the decomposition chamber along the second trajectory;
wherein the second trajectory is different from the first trajectory;
wherein the decomposition chamber is centered on a decomposition chamber central axis and bisected by a decomposition chamber vertical axis orthogonal to the decomposition chamber central axis;
wherein the first dosing module and the second dosing module are coupled to the decomposition chamber on opposite sides of the decomposition chamber vertical axis;
wherein the first dosing module comprises a first injector configured to provide reductant into the decomposition chamber, the first injector centered on a first injector central axis that is angularly separated from the decomposition chamber vertical axis by a first injector axis angle in a first direction;
wherein the second dosing module comprises a second injector configured to provide reductant into the decomposition chamber, the second injector centered on a second injector central axis that is angularly separated from the decomposition chamber vertical axis by a second injector axis angle in the first direction; and
wherein the second injector axis angle is different from the first injector axis angle.

34. The aftertreatment system of claim 33, wherein the second injector axis angle is approximately equal to 360 degrees less the first injector axis angle.

35. The aftertreatment system of claim 33, wherein the first injector axis angle is between 0 degrees and 90 degrees, inclusive, and the second injector axis angle is between 270 degrees and 360 degrees, inclusive.

36. The aftertreatment system of claim 33, wherein the first injector axis angle is between 0 degrees and 90 degrees, inclusive, and the second injector axis angle is between 0 degrees and 90 degrees, inclusive.

* * * * *